UNITED STATES PATENT OFFICE.

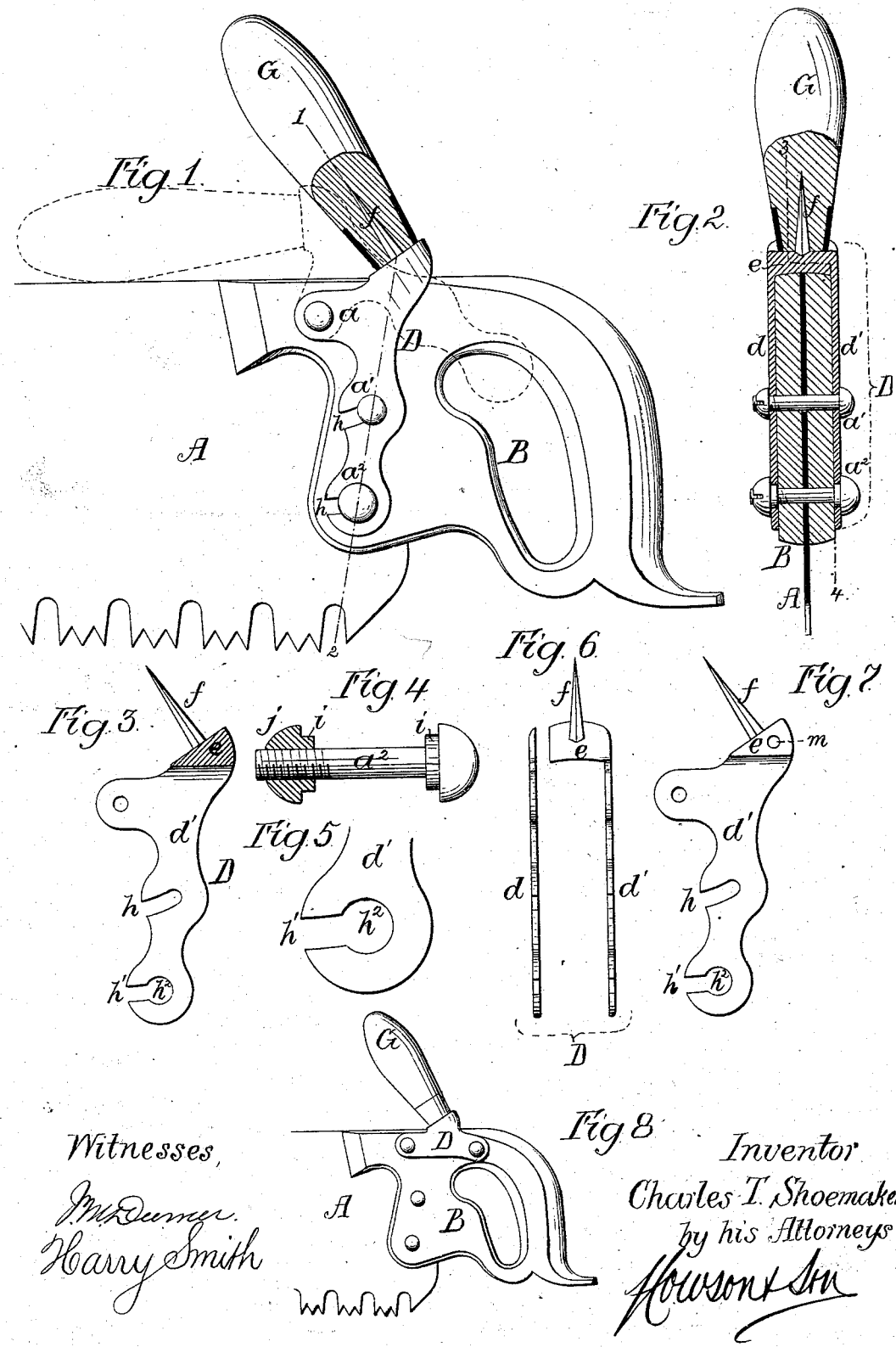

CHARLES T. SHOEMAKER, OF PHILADELPHIA, PENNSYLVANIA, ASSIGNOR TO HAMILTON DISSTON, ALBERT H. DISSTON, AND HORACE C. DISSTON, OF SAME PLACE.

IMPROVEMENT IN SAW-HANDLES.

Specification forming part of Letters Patent No. 219,533, dated September 9, 1879; application filed August 7, 1879.

*To all whom it may concern:*

Be it known that I, CHARLES T. SHOEMAKER, of Philadelphia, Pennsylvania, have invented a new and useful Improvement in Saw-Handles, of which the following is a specification.

My invention relates to improvements in the handles of that class of saws known as "one-man crosscuts," in which it is desirable to furnish the blade with one handle directly opposite the butt end of the blade and a supplementary handle above the blade, so that the saw can be conveniently and efficiently handled.

The main object of my invention is to firmly secure the supplementary handle to the main handle—an object which I attain in the following manner, reference being had to the accompanying drawings, in which—

Figure 1 is a side view of my improved saw-handle; Fig. 2, a transverse section on the line 1 2, Fig. 1; Fig. 3, a section of the supplementary-handle frame on the line 3 4, Fig. 2; Figs. 4 and 5, views illustrating the plan which I prefer of bolting the supplementary-handle frame to the wooden handle; and Figs. 6, 7, and 8 represent modified plans of carrying out my invention.

A is a portion of the blade of the saw, and B the main handle, which is of the form usually adopted in making what are known as "one-man crosscut-saws."

D is the frame of the supplementary handle, and consists of opposite side pieces or cheeks $d\ d'$, connected together at the top by, and in the present instance forming a part of, the cross-piece $e$, from which projects a tang, $f$, driven into the supplementary handle G, the latter being made of wood strengthened by a ferrule, and being similar, generally, to an ordinary file-handle.

The supplementary handle may be screwed onto a threaded stem cast on the frame, or may be otherwise fastened to the latter.

The frame is made to fit snugly over the main handle B, on the upper edge of which rests the cross-piece $e$ of the frame, which should be made of malleable cast-iron or other tough and slightly elastic metal, so that the cheeks will yield on tightening the nuts of the bolts and firmly gripe the main handle.

Three bolts, $a$, $a'$, and $a''$, pass through the cheeks of the frame, through the main handle and in the present instance through the blade also.

In packing the saw for transportation the supplementary handle would be much in the way; hence I prefer to so make the frame that its cheeks can be readily released from the two lower bolts and turned on the upper bolt as a pivot to the position shown by dotted lines. For this purpose the holes $h\ h'$ in the cheeks for the two lower bolts are slotted, so as to extend through the front edges of the cheeks, as shown in Fig. 3—an arrangement which also permits a limited adjustment of the supplementary handle to different inclinations, for on loosening the nuts of the lower bolts the frame will be at liberty to be turned on the pivot-bolt $a$.

The lower bolts and the bolt-holes in one of the cheeks of the frame may be made in the manner illustrated in Figs. 4 and 5, in which the hole in one of the cheeks is large enough to receive a circular projection, $i$, on the nut $j$, while the slot extending from the hole is only large enough to admit the stem of the bolt. By this arrangement the frame will be locked to the bolt, even after the nut is loosened, and until the nut is so far unscrewed that its projection $i$ shall be free from the hole $h''$ in the cheek.

The frame for the supplementary handle may be made in two pieces, as shown in Figs. 6 and 7, in which case the two parts should be bolted together at the top $m$.

Provision may also be made in this case for confining the butt of the handle between the two parts.

It is not essential that the frame and its cheeks should be constructed and secured to the handle in the precise manner described above. The frame, for instance, may be formed and attached to the handle, as shown in Fig. 8; but the plan heretofore referred to is to be preferred, and it is also preferable to utilize the bolts required in securing the frame to the handle by making them the medium of securing the saw-handle to the blade.

I claim as my invention—

1. The combination of the handle B of a saw with a metal frame carrying a supplementary handle, G, and having cheeks $d\ d'$ bolted to opposite sides of the handle, all substantially as set forth.

2. The combination of the blade A and handle B of a saw with the supplementary-handle frame D, and bolts passing through the handle and blade, all substantially as specified.

3. The combination of the handle B with the supplementary-handle frame pivoted to the said handle B by the bolt $a$, and having slotted holes for the remaining bolts, substantially as and for the purpose set forth.

In testimony whereof I have signed my name to this specification in the presence of two subscribing witnesses.

CHAS. T. SHOEMAKER.

Witnesses:
   CHAS. F. TIETZE,
   HARRY SMITH.